T. HARDING.
HOSE CLAMP.
APPLICATION FILED NOV. 12, 1909.
972,372.
Patented Oct. 11, 1910.
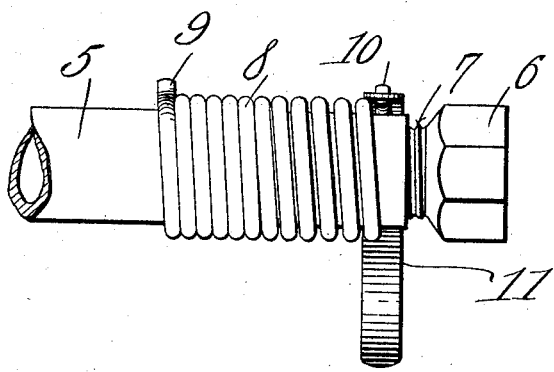
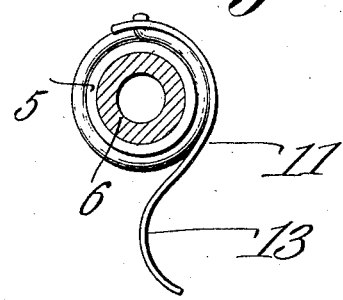
Witnesses
Inventor
Thomas Harding
By C. A. Snow & Co.
Attorneys

UNITED STATES PATENT OFFICE.

THOMAS HARDING, OF SAN JOSE, CALIFORNIA.

HOSE-CLAMP.

972,372.

Specification of Letters Patent.    Patented Oct. 11, 1910.

Application filed November 12, 1909. Serial No. 527,667.

*To all whom it may concern:*

Be it known that I, THOMAS HARDING, a citizen of the United States, residing at San Jose, in the county of Santa Clara and State of California, have invented a new and useful Hose-Clamp, of which the following is a specification.

This invention relates to hose clamping devices and has for an object to provide a spiral spring clamp which may be applied externally to a flexible hose and will effectually bind the same to a hose coupling and maintain a water tight joint between the two.

A further object is to provide a spiral clamp that may be readily expanded for a portion of its length to facilitate the coupling or uncoupling of the hose.

A still further object is to provide a spiral clamp that will promote the advance of a threaded metallic coupling in the hose and will be held against accidental rotation upon the latter.

With the above advantages and other objects in view, the invention embraces the structure hereinafter more fully described and claimed, it being understood that various modifications in the minor details of construction may be made within the scope of the appended claim.

In the accompanying drawing, forming part of this specification, Figure 1 is a side elevation of the hose and metallic coupling part with my improved hose clamp applied thereto and assembled with a special tool to facilitate the coupling and uncoupling of the hose. Fig. 2 is an end elevation of the hose coupling equipped with my improved hose clamp with parts broken away. Fig. 3 is a perspective view of a special tool for manipulating the hose clamp.

Like characters of reference designate similar parts in the views shown.

Referring to the parts by their reference characters, 5 designates a flexible hose and 6 a metallic coupling part provided with the usual threaded shank 7 to be inserted into the end of the hose as by screwing it in place. In order that it may bind tightly therein, it is of a size larger than the normal size of the bore of the hose so that the latter must be expanded slightly when the shank is inserted.

In order to securely bind the hose to the threaded shank and maintain a water tight joint between the two at all times, I provide a spiral spring coil 8 which is preferably mounted upon the hose before the insertion of the metallic coupling part therein. The spiral spring clamp is of greater length than the shank 7 so that its inner portion extends back onto the hose some distance beyond the point to which the inner end of the shank will reach. Said spiral is also of an internal circumference smaller than the normal external circumference of the hose, so that when placed thereon its rear portion will compress the hose with sufficient force to hold itself thereon against rotation, and its front portion which surrounds the hose and shank will expand slightly and yet clamp these parts tightly together. A sufficient number of convolutions is formed in the spiral coil to permit the forward portion of the coil to be expanded without affecting the opposite end portion. The object of this construction is to permit the forward end of the spiral clamp to be expanded so that the metallic coupling part may be easily advanced in the bore of the hose when the operation of coupling is being performed. The opposite end of the clamp during this operation will maintain its original position upon the hose and is adapted to bind tightly upon the exterior walls of the hose and prevent the independent rotation of the clamp when its forward end is being expanded.

To facilitate the expansion of the convolutions forming the clamp, each terminal 9 and 10 of the clamp is bent outwardly and extends radially from the outer surface of the coil. The radial ends of the coil terminate a sufficient distance from the outer surface of the coil to be effectively grasped by the head of a special tool or spanner 11. The latter comprises a flat piece of metal bent at one end to conform to the contour of the clamp and having an orifice 12 to engage the projecting end 10 of the coil. The opposite end of the spanner 11 is bent reversely to the coil engaging portion to provide a convenient finger grip 13 by means of which one hand of the operator may be employed to expand the clamp while the other hand is used in manipulating the metallic coupling part 6.

It is evident that when the clamp is expanded, as shown in Fig. 1, the metallic coupling part may be readily inserted in the bore of the hose and when the clamp is permitted to assume its normal position the threads of the metallic coupling part will be pressed into the inner wall of the hose and will be held in this position by the gripping power of the spiral clamp.

What is claimed is:

The combination with a hose, and a metallic coupling part having a tubular, exteriorly-threaded shank larger than the normal size of the bore of the hose and adapted to be inserted into its end; of a spiral spring longer than said shank and of smaller internal circumference before it is expanded than the normal external circumference of the hose, whereby the rear end of the spring clamps the hose while the shank is screwed into the end of the hose and expands the front end of the spring.

In testimony that I claim the foregoing as my own, I have hereto affixed my signature in the presence of two witnesses.

THOMAS HARDING.

Witnesses:
J. H. RUSSELL,
H. T. WELCH.